Nov. 21, 1967 R. O. OSBORN 3,353,999
CONDUCTIVE FILM BATTERY
Filed Dec. 21. 1964

INVENTOR
ROBERT OTTO OSBORN

BY *Robert W. Black*

ATTORNEY

3,353,999
CONDUCTIVE FILM BATTERY
Robert Otto Osborn, Snyder, Buffalo, N.Y., assignor to E. I. du Pont de Nemours and Company, Wilmington, Del., a corporation of Delaware
Filed Dec. 21, 1964, Ser. No. 419,707
4 Claims. (Cl. 136—83)

This invention relates to batteries and more particularly to a battery having cells encapsulated by flexible, ion-impermeable, conductive films which serve as electrodes, encapsulators, and cell couplers.

Numerous battery types have been developed, but specialized uses are constantly arising for which available designs are unsatisfactory or are undesirable compromises. One major deficiency is that the basic battery structure, both with primary cells and with rechargeable types, does not permit much latitude or flexibility in the final form.

There is a particular need for batteries which can be fitted into compact spaces or to conform to irregular surfaces, both as primary sources of electric power, and as storage batteries which can serve a dual function as a ballast and for storage. This latter type is of particular utility in certain types of space craft employing solar radiation as a source of power. Both primary and secondary batteries have been designed which possess some degree of flexibility in physical form, but these have difficulties which seriously limit their reliability and preclude their use in extremely critical applications. For example, batteries have been constructed with flexible conductive components, but have employed internal metallic elements such as collectors which have no electrochemical function, but which often cause unforeseen failure by virtue of local cell reactions. Furthermore, the flexible polymeric materials employed often contain extractable non-polymeric materials which can lead to electrolytic short circuits as a result of ion passages created therein. Likewise, batteries without metallic collector units are known, but these are relatively rigid design and are not adapted to a variety of shapes and forms. Another deficiency of prior art batteries which necessitates a compromise is that they are not generally self-contained, but require additional enclosures or encapsulating means to prevent loss of its electrolyte or its aqueous components.

It is an object of the present invention, therefore, to provide a battery which obviates these difficulties and is of a flexible design capable of being adapted to desired shapes or forms.

It is a further object of the present invention to provide a flexible, form-fitting battery having therein no metallic elements other than those required for electrochemical action.

It is still a further object of this invention to provide a battery having low resistivity, polymeric film electrode plates which serve as intercell couplings.

These and other objects are accomplished by means of a battery having cells wherein the encapsulating element is a flexible conductive film capable of forming a hermetic seal, a marginal, insulating spacer to insulate the anode from the cathode, an electrolyte with appropriate depolarizers within the volume defined by the marginal spacer, and the anode and a cathode in contact with the electrolyte.

Batteries constructed according to the present invention employ non-metallic electrodes which form containing walls for individual cells. Electrolytically active metals, which are the only metals present in the cell interior, are preferably vapor deposited on the electrodes, which are electrochemically inert, conductive, flexible polyvinyl fluoride films. The surface of the film can be abraded to form a nap which aids in the adhesion of the coating.

The present invention is best understood by consideration of characteristic features: the use of flexible, ion-impermeable conductive films as electrodes, as encapsulating means and as cell couplers; the absence of metals, except for those electrolytically involved in the cell interior, and the resultant variety forms to which the structure can be adapted. These features can be best understood by reference to the figures, wherein.

The present invention, to a large extent, relies upon the ability of the film employed to provide good conductivity, to be inert to the electrolyte, and to provide a means for sealing to prevent loss of volatile electrolytes. A particularly suitable film for this purpose is polyvinyl fluoride, having up to 30% carbon black dispersed therein and in the preferred form has from 10 to 20% carbon black. The procedure for preparation generally encompasses the preparation of an organosol in a medium such as dimethyl acetamide in a mixer (Hobart), of approximately 30% solids consisting of 80% polyvinyl fluoride, and 20% carbon black. This organosol, extruded as a gel film after removal of the solvent, provides a dense, ion-impermeable, conductive film of a volume resistivity of the order of 1 ohm-centimeter.

Figure 1:
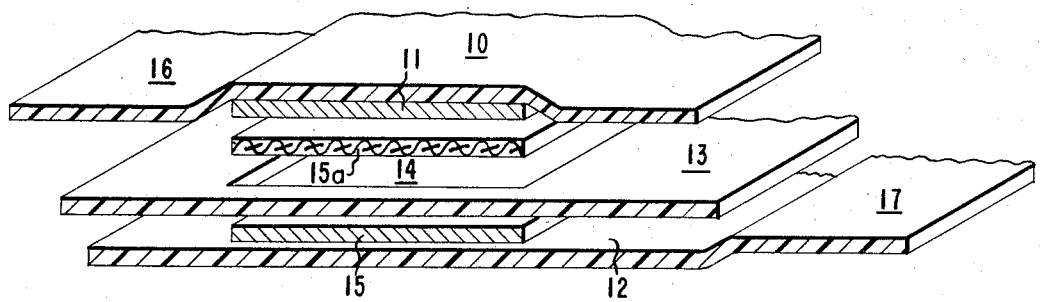
FIGURE 1 illustrates, partly in cross section, an exploded view of a cell constructed according to the present invention.
Figure 2:
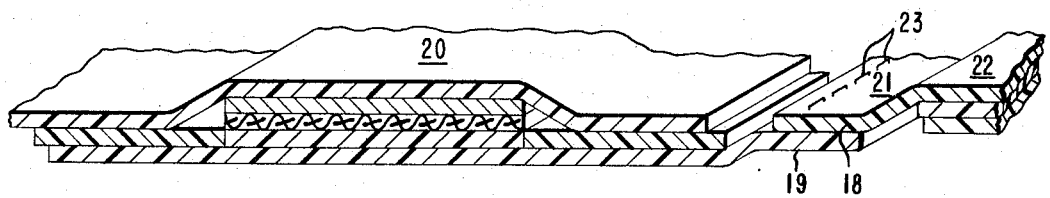
FIGURE 2 illustrates, partly in cross section, a modular battery unit constructed according to the present invention.

Referring now to FIGURE 1, which illustrates an embodiment of this invention in the form of a Leclanche cell adapted to a planar configuration battery, the relationship of the respective elements can be seen in an exploded view. Anode collector 10 is shown as removed from anode 11; in practice the anode is a thin film of zinc deposited on the conductive film which serves as a collector. Electrode 12, is a carbon black filled organic polymer film capable of being hermetically sealed, which functions as a cathode, and a structural member to encapsulate the cell, and is insulated from anode collector 10 and anode 11 by marginal insulating spacer 13 which has central opening 14 to admit electrolyte 15a. The electrolyte is in the form of a tablet having substantially parallel walls which are nearly planar or at most only sightly convex. Opening 14 in insulating spacer 13 permits good electrical contact between anode 11, electrolyte 15a, and cathode 12 or cathode 15 (optionally shown). When a zinc-carbon electrode is not employed, cathode 15 is added as a deposited film on electrode 12. These elements, as illustrated in FIGURE 2, are brought into intimate contact and are placed in a chamber at reduced pressure, but not at a pressure so low as to cause loss by evaporation of aqueous components of the electrolyte, but sufficient to remove occluded air. At this point the marginal edges around the spacer are heat-sealed as close as convenient to the edges of the electrolyte tablet. This cell, which preferably employs carbon filled polyvinyl fluoride as the flexible conductive film, can use any chemically inert, insulating, flexible film for the marginal spacer 13; polyethylene or polypropylene as well as unfilled polyvinyl fluoride are satisfactory. This spacer extends just beyond the shorter ends of the anode collector 10 and electrode 12, as shown in FIGURES 1 and 2, to prevent cells from being shorted out during flexing.

Anode collector 10 and electrode 12 can be any electrochemically inert, flexible electrically conductive film of an organic polymer which is capable of being hermetically sealed. Such organic polymer base films include polyvinyl fluoride, polyvinyl chloride, polyolefins, and polyacrylonitrile.

The particular embodiment shown in FIGURE 1 is adapted to a planar battery configuration. For this reason, collector 10 and electrode 12 have tabs 16 and 17 extending on opposite edges of the cell so as to provide means for coupling the cells in series to form the battery. These tabs, when the cells are thus coupled, overlap tabs of the opposite polarity on adjacent cells for series coupling, and are secured in place by heat sealing or welding. This arrangement is illustrated in slightly more detail in FIGURE 2.

Referring to FIGURE 2, a series electrical coupling between the cells is illustrated as junction 18. To improve the bond at this point, the conductive cathode tab 19 of cell 20 and conductive anode tab 21 of cell 22, are sealed along this line with a broad heat-seal or with a solvent such as dimethyl acetamide. However, to provide added strength to the module, the junction can be stitched as shown by stitches 23. These stitches should be carefully placed to avoid puncturing the encapsulated cells. The internal resistance of the battery is dependent upon the maintenance of a low resistance of the couplings between the cells; the conductive film provides an extremely low resistance coupling between separate cells of a pile-type battery, wherein the anode collector of one cell is superposed on the electrode of the adjacent cell, by virtue of having only a few mils of conductive film between the cells. With the planar structure, on the other hand, appreciable lengths of film in the cell coupling can increase the resistance to a point beyond tolerable limits for certain applications. Therefore, several factors should be considered in constructing the planar cells. First, the cell should be coupled as closely as possible by the overlapping tabs, so that the electrical path along the plane of the film is of a minimum length; secondly, overlap of the tab of a collector to the next adjacent cell should be a maximum so as to reduce the contact resistance; and finally, the external surfaces of the collector 10 and electrode 12 can have a metal coating to reduce the transverse resistance. This coating, as indicated hereinafter with respect to application of electrode materials to the base film, should be masked so that the areas subjected to the sealing or welding are not metallized, otherwise electrolytic erosion can occur which will impair the seal.

The electrolyte as indicated in FIGURE 1 is intended to include not only the electrolyte, but also the depolarizers such as the "black mix" employed with the Leclanche cell. The depolarizer mix in the form of a molded cake (of the appropriate size for the cell) wetted with electrolyte (e.g., aqueous ammonium chloride) is pressed into contact with a co-extensive mat 15a of fibrous or foramonius material saturated with the aqueous electrolyte. For this fibrous material, an open, loose mat of polypropylene has been found satisfactory. This material can hold more than its weight of the aqueous system and is chemically inert; however, for most uses ordinary paper is quite satisfactory, or the usual electrolyte paste, as is known to the art, can be employed. It will be obvious that the electrolyte-containing matrix will be adjacent to the zinc electrode. A particular feature of this invention is that carbon-filled polymer film functions as the carbon electrode.

The usual electrolyte employed in the Leclanche cell is a solution of ammonium chloride, which may have a small quantity of mercuric chloride added. The present invention is also adapted to the use of the so-called cold weather electrolyte which is a solution containing 12% zinc chloride, 15% lithium chloride, and 8% ammonium chloride, and 65% water. This electrolyte is useful to temperatures as low as $-40°$ C.

The cells of the present invention, by virtue of the flexible film structure, avoid the need for inclusion of free space in the cell structure during fabrication, since the flexibility of the enclosure will provide for a minor expansion in volume; this may occur without interruption of circuit continuity by generation of small quantities of gases.

The present invention is adapted to other types of primary cells, and is particularly advantageous when employed with the mercury cell. In general, batteries of the mercury cell suffer from a rapid diminution of output at temperatures below $70°$ F.; modular mercury batteries constructed according to the present invention, and fitted on the interior of clothing for maintenance of higher temperatures, have greatly enhanced utility in the field in cold climates.

The film mercury battery, however employs a fabricated cathode attached to the conductive film, rather than the simple carbon filled film cathode of the Leclanche cell; the anode is likewise fabricated prior to the application to the conductive film. This cathode is fabricated by means of a composition containing approximately 95 parts mercuric oxide and 5 parts carbon to which sufficient water is added to produce a thick paste. This paste is rolled to a thin film ($1/64$ to $1/32$ of an inch thick) and cut into squares of the appropriate size for the cathodes. These are transferred to the conductive polyvinyl fluoride film, which has its surface slightly roughened by fine sanding prior to application of the electrode to improve adhesion of the cathode cake to the film, until the cell is assembled.

The electrolyte, consisting of 100 parts potassium hydroxide, 16 parts zinc oxide, and 100 parts water is absorbed on a mat of polypropylene non-woven fabric. The anode, consisting of an amalgam of 90 parts zinc and 10 parts mercury is applied in a manner similar to the cathode, and the whole combination is assembled with a marginal insulating spacer in a manner similar to that described in the Leclanche cell.

Figure 3:
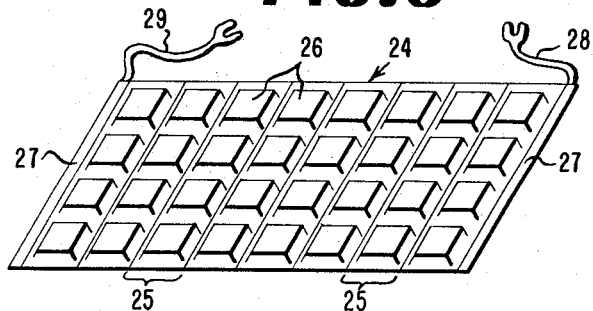
FIGURES 3 and 4 illustrate modular batteries constructed according to the present invention.

A series-parallel modular battery constructed according to the present invention is illustrated in FIGURE 3. This battery is in the form of a flexible sheet 24, which in turn consists of a series of parallel strip cells, each strip 25 has a plurality of individual cells 26 which are formed on the strip; strips are heat sealed together at 30 so as to form a battery, in this case having eight cells in series and four in parallel. To facilitate coupling to an external utilization circuit, metal foil strips 27 are heat sealed to end cells of the series, with coupling wires 28 and 29 provided. A particular advantage of the multiple-cell, parallel arrangement is a longer useful life of the battery in event of failure by open circuits of separate cells.

Figure 4:
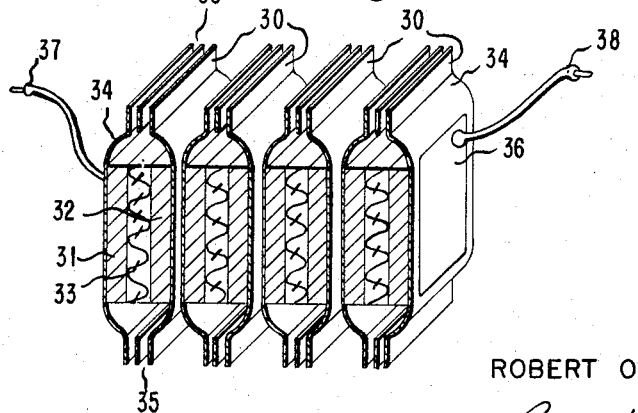

Another embodiment of a battery constructed according to the present invention is illustrated in FIGURE 4. In this embodiment, individual cells 30, shown partly in sectional view, are placed back-to-back, and are held tightly in contact by strapping or use of a clamp. (As shown, the cells are slightly separated for purposes of clarity of illustration.) These cells contain electrodes 31 and 32, separated by electrolyte containing matrix 33. The electrodes, the electrochemically active materials, are attached directly to flexible conductive polymer envelopes 34, which are separated from each other in each cell by insulating marginal spacers 35. For convenience of coupling to an external utilization circuit, metal foil square 36, to which are soldered lead wires 37 and 38, are provided.

The use of flexible, conductive ion-impermeable films to make flexible, simple electric batteries is adaptable to the rechargeable battery such as the lead-sulfuric acid battery, and the nickel-cadmium battery. These batteries, for the most part, may not be suitable for all uses of storage batteries but are useful in specialty applications. For example, these can be employed to provide stabilization in low power, direct current generating devices where the output can vary over a relatively wide range.

The lead-acid type can be constructed by first depositing a thin lead film on the electrode, with proper masking to provide unmetalized areas for sealing. Sheets or strips of conductive film for a large number of electrode areas are masked by means of a coating of a hydrocarbon grease or other suitable means to prevent electrolytic deposition, so that a plurality of electrodes will be formed. These sheets are submerged in a solution of 45 grams of lead nitrate, and 7.5 grams of 69% nitric acid in 150 ml. water, and a potential equivalent of 1 amp. per sq. inch at 3 volts is applied. Those sheets at the negative electrode receive a coating of lead and those at the positive electrode receive a coating of lead dioxide. After a uniform deposit on each, followed by careful washing, a battery is assembled employing a mat of non-woven polypropylene fabric to contain the sulfuric acid electrolyte (sp. gr. 1.25). Such batteries are effective in retaining charge over a period of several weeks while undergoing repeated charge-discharge cycles.

The nickel-cadmium cell, with its relative freedom from gassing and the charge-discharge cycle, in which the net result appears to be a transfer of oxygen from one plate to the other without appreciable change in the electrolyte, is especially adapted to this type of cell. The narrow separation, with the electrolyte-retaining matrix between the film-supported anode and the cathode reduces internal resistance to a minimum; the structure provides a low cost utility cell. Maintenance of low charging voltages, e.g., voltages not substantially greater than 1.4 per cell, e.g., by using 21 cells in series instead of 20 for a nominal 28-volt circuit, the voltage dropped per cell will be decreased to the point where gassing is negligible over a number of charge-discharge cycles. The sacrifice in overall capacity is offset by the elimination of the requirement for venting means, which enables low cost fabrication, and a battery which still achieves a high capacity-to-weight ratio.

The cells, which take the basic overall form described hereinbefore for dry cells and the sulfuric acid cell, are produced by first depositing metallic nickel on the cathode collector support, which is a strip of conductive film, in appropriate areas by means of masking the areas intended for sealing joints, by a suitable technique such as vacuum deposition. (Cathode-beam melting is preferred for the vacuum deposition apparatus in order to maintain high purity of nickel.) Similarly, the cadmium for the anode on its support strip of conductive film is coated with cadmium in selected areas. The nickel in the coated strips is converted to the hydrated oxide ($NiO_2 \cdot xH_2O$) by coupling the strip as the positive electrode in a 15% potassium hydroxide solution with a stainless steel negative electrode, and electrolizing, starting at approximately 1.5 volts and gradually increasing the voltage to maintain a constant current until the voltage of 1.75 is reached, and then maintaining the current at this voltage for a period of time equivalent to ¼ the time required to reach this voltage. This procedure insures a substantially complete conversion of the nickel to the oxide without excessive gassing to damage the nickel oxide adhering to the conductive film. The film strip having the nickel oxide patches thereon is removed from the potassium hydroxide bath, and allowed to dry before cell assembly. The cell, or groups of cells for battery modular construction are then assembled according to the teaching hereinbefore, with the corresponding cadmium anodes, a solution of 15% potassium hydroxide on a mat of non-woven polypropylene fabric, and the nickel oxide cathode. Batteries constructed of cells as employed with limited charging voltage, and indicated hereinbefore, show satisfactory performance on multiple charge-discharge cycles, with no evidence (i.e., bulging of cells and circuit interruption) of gas.

The principal advantages over known types of cells possessed by cells of the present invention lie in the relative simplicity of the present, which results in convenience of adaptability and low cost. Cells constructed according to the present invention enable the fabrication of specialty type of batteries not conveniently constructed from known types of cells.

What is claimed is:
1. An encapsulated electrochemical cell consisting essentially of electrochemically active materials therewithin in cooperative electrical association with
    (a) an anode collector of an electrically conductive and flexible film structure consisting essentially of organic polymeric material and up to 30% carbon black, and
    (b) a cathode collector of an electrically conductive film structure consisting essentially of organic polymeric material and up to 30% of carbon black, said cathode collector disposed adjacent to said anode collector in substantially planar relation thereto, and each of said collectors separated from the other by
    (c) at least one electrode of electrochemical active material disposed adjacent to and contacting one of said collectors and
    (d) an insulating sheet spacer of substantially planar construction having a tablet electrolyte disposed therein between said electrodes and having said anode collector hermetically sealed to one surface thereof and said cathode collector hermetically sealed to the opposite surface thereof.

2. The encapsulated electrochemical cell of claim 1 wherein one of said electrodes is an anode of zinc deposited on said anode collector of polyvinyl fluoride filled with up to 30% carbon black and said cathode collector is polyvinyl fluoride filled with up to 30% carbon black.

3. A battery comprising a plurality of the encapsulated electrochemical cells of claim 2 in series electrical connection wherein the anode collector of each cell is joined to the cathode collector of the next adjacent cell.

4. A battery of the cells defined in claim 1 wherein said cells are rechargeable storage cells.

References Cited
UNITED STATES PATENTS

| | | | |
|---|---|---|---|
| 3,026,365 | 3/1962 | Hughes et al. | 136—120 X |
| 3,189,485 | 6/1965 | Panzer | 136—120 X |
| 3,239,380 | 3/1966 | Berchielli | 136—120 X |

WINSTON A. DOUGLAS, *Primary Examiner.*

B. J. OHLENDORF, A. SKAPARS, *Assistant Examiners.*